E. L. RAGONNET.
VALVE MECHANISM FOR COMPOUND LOCOMOTIVES.
APPLICATION FILED JUNE 20, 1912.
1,059,762.
Patented Apr. 22, 1913.
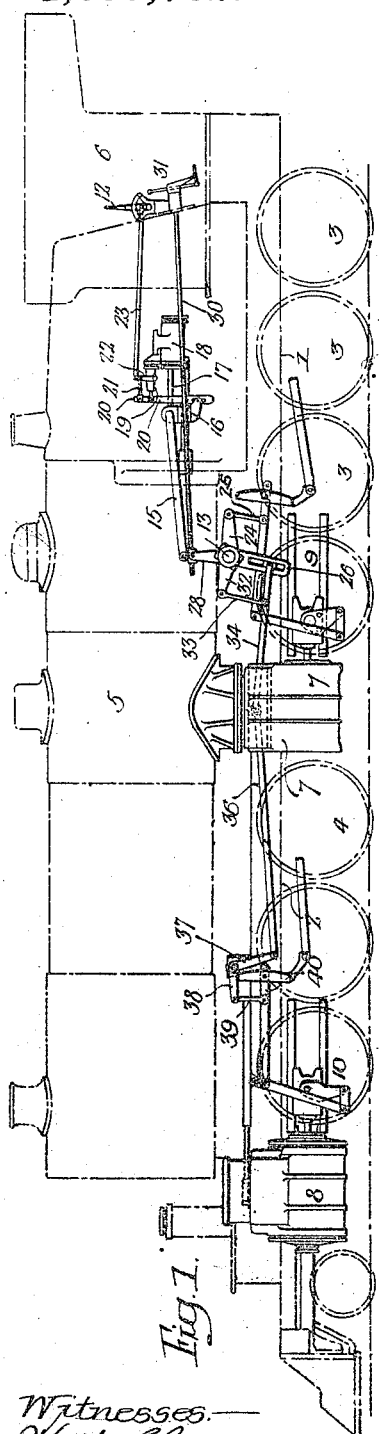
Witnesses:
Inventor
Eugene L. Ragonnet.
by his Attorneys.

UNITED STATES PATENT OFFICE.

EUGÈNE L. RAGONNET, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

VALVE MECHANISM FOR COMPOUND LOCOMOTIVES.

1,059,762.  Specification of Letters Patent.  Patented Apr. 22, 1913.

Application filed June 20, 1912. Serial No. 704,801.

*To all whom it may concern:*

Be it known that I, EUGÈNE L. RAGONNET, a citizen of the Republic of France, residing in Philadelphia, county of Philadelphia, State of Pennsylvania, have invented certain Improvements in Valve Mechanism for Compound Locomotives, of which the following is a specification.

My invention relates to certain improvements in valve mechanism for compound engines, known as the "Mallet" type, *i. e.*, a locomotive in which there are two frames pivotally connected at the center and both supporting the locomotive boiler. On the rear frame, in the present instance, is the high pressure cylinder and on the forward frame is the low pressure cylinder. Each of these frames carries its own driving mechanism and both mechanisms are controlled by a single mechanism at the cab.

The object of my invention is to provide means whereby one valve mechanism can be moved independently of the other, so as to regulate the cut off. This is accomplished by mechanism at the cab.

In the accompanying drawings:—Figure 1, is a side view of a locomotive in diagram, illustrating my invention; Fig. 2, is a sectional view of part of the shifting mechanism shown in Fig. 1; and Fig. 3, is a view looking in the direction of the arrow, Fig. 2.

Referring to the drawings, 1 is the rear frame of the locomotive.

2 is the forward frame.

3, 3 are the driving wheels of the rear frame and 4, 4 are the driving wheels of the forward frame.

5 is the locomotive boiler, which extends over both frames, and 6 is the cab of the locomotive.

On each side of the rear frame are the high pressure cylinders 7, and on each side of the forward frame are the low pressure cylinders 8.

9 is the valve mechanism of the high pressure cylinders 7, and 10 is the valve mechanism of the low pressure cylinders 8.

As before remarked, the usual practice is to move both of the valve mechanisms in unison through a cylinder 18, which is controlled by a lever 12 in the cab of the locomotive.

On a shaft 13, mounted in suitable bearings in the frame of the locomotive, is an arm 14, which is connected by a rod 15 to a slide 16 to which the piston rod 17 is connected. This piston rod has a piston adapted to a controlling cylinder 18 which is provided with a valve mechanism, the valve rod 19 of which is pivotally attached to a lever 20 and this lever is in turn connected by a link 21 to a lever 22 and attached to the outer end of this lever is a rod 23 which extends to the operating lever 12 in the cab of the locomotive.

The rock shaft 13 has an arm 24 connected by a link 25 to the valve mechanism 9 of the high pressure cylinder 7. This valve mechanism is of the ordinary type and is controlled solely by the movement of the lever 12 in the cab of the locomotive. Also on this rock shaft 13 is a slotted arm 26, which actuates the valve mechanism 10 of the low pressure cylinder 8.

In order to vary the cut off of the low pressure cylinder, I mount on the shaft 13 a sleeve 27 having an arm 28 on which is a swiveled head 29 having a threaded interior, and extending through this threaded head is a rod 30, on the end of which is a screw thread adapted to the screw thread in the head. This rod extends to the cab of the locomotive and is provided with a hand lever 31 by which it is turned; the turning of the rod causes the sleeve 27 to be rocked on its pivot. On the sleeve 27 is an arm 32 connected by a link 33 to a rod 34. Pivoted to the end of this rod is a block 35 adapted to the slot in the arm 26, so that, upon turning the rod 30, the block 35 will be raised or lowered in the slot. The rod 34 is connected to a rod 36 by a swivel joint in the present instance, and the rod 36 is in turn connected to an arm 37 of a bell crank lever pivoted to the frame; the other arm 38 of the bell crank lever being connected by a link 39 to the rod 40 of the valve mechanism 10. It will be seen, therefore, that by adjusting the block 35 in its slot in the arm 26, more or less throw can be given to the lever of the valve mechanism, so as to regulate the cut off of the low pressure cylinder independently of the regulation of the cut off of the high pressure cylinder, yet both valves are controlled or operated from a single controlling device at the cab of the locomotive.

I claim:—

1. The combination in a locomotive of the "Mallet" type, of rear and forward frames pivotally connected; a high pressure cylinder on the rear frame and a low pressure cylinder on the forward frame; valve mechanism for each cylinder; a controlling device on the rear frame for actuating both valves in unison; an adjustable device for regulating the cut off of the valve of the low pressure cylinder; and mechanism extending from the device to the cab of the locomotive.

2. The combination in a compound locomotive of the "Mallet" type, of a high pressure cylinder and a low pressure cylinder; valve mechanism for each cylinder; a rock shaft; controlling mechanism for actuating the rock shaft; said rock shaft being coupled directly to the valve mechanism of the high pressure cylinder and having a slotted arm; with a rod connected to the valve mechanism of the low pressure cylinder and having a block adapted to the slot in the arm of the rock shaft; and means for adjusting the position of the block in the arm, whereby the cut off of the low pressure cylinder will be regulated independently of the controlling mechanism which actuates both valves.

3. The combination in a compound engine of the "Mallet" type, of two frames connected together; a high pressure cylinder on the rear frame; a low pressure cylinder on the forward frame; valve mechanism for the cylinders; a rock shaft having an arm; a rod connected to the arm; controlling mechanism for actuating the rock shaft through the arm and through the rod; a second arm on the rock shaft connected directly to the valve mechanism of the low pressure cylinder; and a third arm on the rock shaft; said arm being slotted; with a block mounted in the slot; a rod connected to the block and to the valve mechanism of the low pressure cylinder; a sleeve on the rock shaft; an arm on the sleeve; a link connecting the arm with the rod leading to the low pressure cylinder; a second arm on the cylinder carrying a threaded head; and a threaded rod adapted to the head and extending to the cab of the locomotive, so that, upon turning the rod, the block in the slotted arm of the rock shaft will be raised or lowered to vary the cut off of the low pressure cylinder.

4. The combination in a locomotive of the "Mallet" type, of rear and forward frames pivotally connected; a high pressure cylinder on the rear frame; a low pressure cylinder on the forward frame; a rock shaft having three arms; one of said arms being connected to valve actuating mechanism controlled from the cab of the locomotive; a second arm connected to the valve mechanism of the high pressure cylinder; a third arm connected to the low pressure cylinder; a block adapted to said third arm; a rod connected to the block; a sleeve mounted on the rock shaft having two arms; a rod connected to one arm and extending to the cab of the locomotive; a link connected to the other arm and to the rod extending to the low pressure valve mechanism; with means for actuating the rod leading to the cab so as to shift the block on the third arm of the rock shaft to vary the cut off of the low pressure cylinder.

In testimony whereof, I have signed my name to this specification, in the presence of two subscribing witnesses.

EUGÈNE L. RAGONNET.

Witnesses:
Jos. H. KLEIN,
Wm. A. BARR.